March 18, 1958  F. KLAEDEN  2,826,978
STEADY REST FOR CAMERAS
Filed Nov. 30, 1956
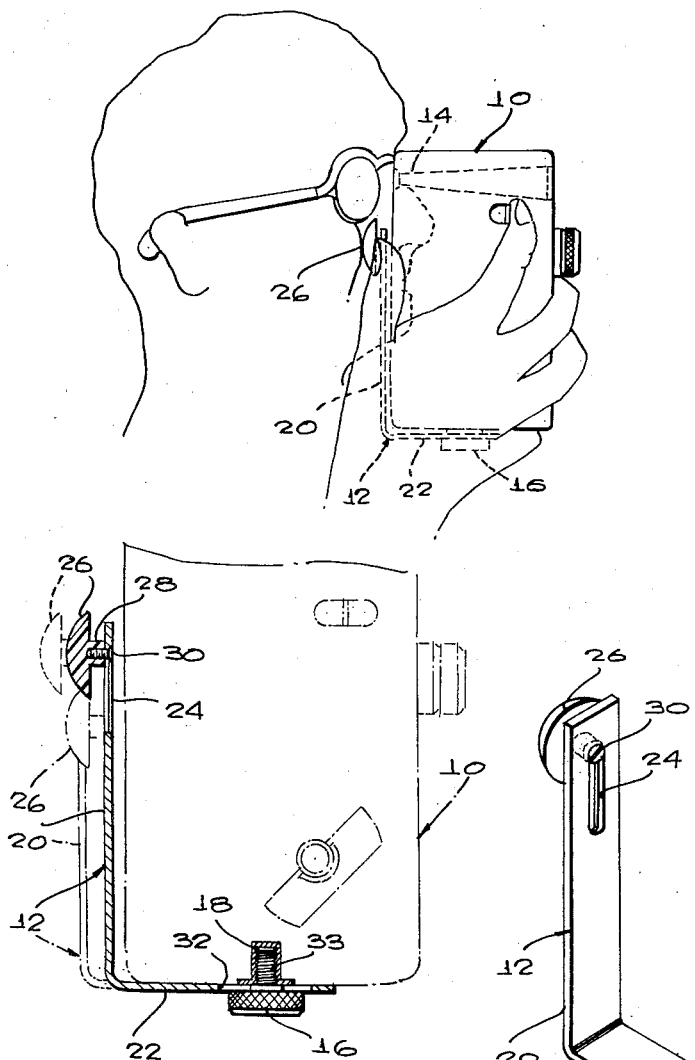
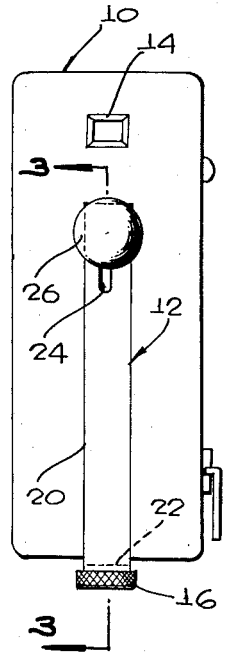
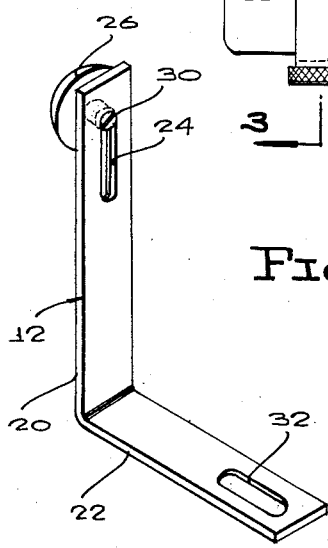
INVENTOR.
FRITZ KLAEDEN
BY
McMorrow, Berman & Davidson
ATTORNEYS

United States Patent Office 2,826,978
Patented Mar. 18, 1958

2,826,978

STEADY REST FOR CAMERAS

Fritz Klaeden, San Antonio, Tex.

Application November 30, 1956, Serial No. 625,391

1 Claim. (Cl. 95—86)

This invention relates to camera supports or rests. More particularly, the invention has reference to a steady rest for cameras, usable in conjunction either with still or motion picture cameras, and coming generally within that category of camera rests in which the rest is held against the face for the purpose of holding the camera substantially immobile while a picture is being taken.

While heretofore steady rests for cameras have been proposed for the general purposes set forth above, it has been found that they have not been suitable for use in certain circumstances, have sometimes proved to be excessively complicated to justify commercial production, and at other times have been somewhat uncomfortable in use, as for example when the rest must be gripped between the teeth.

The main object of the present invention is to provide a generally improved device of the character stated, that will not have the deficiencies that have characterized similar devices that have previously been conceived.

Among more specific objects of the invention, are the following:

First, to provide a steady rest that will be adjustable within a comparatively wide range of different positions in respect to the camera, while still being of highly simplified construction;

Second, to form the steady rest in such a manner that it can be used to advantage by persons wearing glasses, it having been found that such persons have difficulty in holding the camera against the face due to the fact that the glasses project outwardly a distance such as to interfere with the placement of the camera directly against the face;

Third, to so form the steady rest that it can be readily adapted, without sacrificing the principles of the invention, to any of various types or makes of cameras;

Fourth, to permit connection of the steady rest to the camera by means of the ordinary tripod screw that is provided upon the lower end of the camera;

Fifth, to facilitate adaptation of the rest to the particular contours of the user's face; and Sixth, to design the steady rest in such a manner that it does not interfere with swift placement of the camera in position for taking the picture, and further, does not interfere with the actual taking of the picture and the operation of the camera.

Other objects will appear from the following description, the claim appended thereto, and from the annexed drawing, in which like reference characters designate like parts throughout the several views, and wherein:

Figure 1 is a side elevational view of a camera equipped with a steady rest according to the invention, as it appears when in use;

Figure 2 is an enlarged rear elevational view of the camera and steady rest;

Figure 3 is a sectional view substantially on line 3—3 of Figure 2 in which the camera has been illustrated fragmentarily and in dotted lines, the steady rest being shown in chain-dotted and dash-dotted outline in different positions to which the same is adjustable; and Figure 4 is a perspective view, still further enlarged, of the rest per se.

Referring to the drawings in detail, designated generally at 10 is a conventional camera to which is applied a steady rest 12 formed according to the invention. In the illustrated example, the camera is a motion picture camera, that shown being a "Revere '80'" camera.

The rest can be used on any of various other cameras, including still cameras, without requirement of changing anything more than the relative dimension of different components of the rest while retaining the shape, the relative arrangement of the parts, and the manner of attaching the same to the camera.

In any event, in the illustrated example, the camera includes the usual view finder 14, and the tripod screw 16 threadable upwardly into a downwardly opening socket 18.

The steady rest 12 constituting the invention includes a single, right-angular, rigid arm formed to include a vertical arm portion 20 and a horizontal arm portion 22 integral with and projecting forwardly from the lower end of the vertical portion. In the upper part of the vertical portion 20 there is formed a longitudinally and centrally extending slot 24 closed at its opposite ends. A knob or button 26 is formed as a segment of a sphere, having a convex surface facing rearwardly for engagement against a selected portion of the face of the user. Knob 26 is provided with a centrally disposed, forwardly projecting boss 28 having a threaded recess receiving a screw 30 that extends through slot 24, with the slot 24 being countersunk to receive the head of the screw.

This construction permits the knob to be adjusted longitudinally of the arm portion 20, by loosening the knob upon the screw, whereby to permit the knob and screw to be shifted longitudinally of the slot, as for example from the full line to the chain-dotted position of Figure 3. In each position to which the knob is so adjusted, it can be tightened against the arm portion to preserve the adjustment.

Further, a slot 32 is formed in the arm, said slot as shown in Figure 4 being disposed adjacent the forward end of the horizontal arm portion 22. Slot 32 is substantially wider than slot 24, to receive a shouldered portion 33 of the tripod screw 16.

The construction permits bodily adjustment of the arm selected distances, limited by the length of the slot 32. The slot can, if desired, extend substantially the full length of the arm portion 22, in this connection.

For example, assuming that it is desired that the knob 26 be adjusted a greater distance from the rear surface of the camera, the knob or tripod screw 16 is loosened, permitting the arm to be shifted from the full to the dotted line position of Figure 3. The knob 26 will now be in the dash-dotted position of Figure 3. In each position to which the arm is so adjusted, knob 26 is vertically adjustable within limits determined by the slot 24. Further, in each position to which the arm is adjusted, the tripod screw 16, when turned home against the underside of the arm portion 22, clampably engages the arm in the selected position of adjustment.

It is to be noted that in each position to which the arm is adjusted in the direction of the length of the slot 32, the arm can be pivoted upon the tripod screw laterally in either direction, so that the knob 26, instead of being centered between the opposite sides of the camera as in Figure 2, could be moved to left or right, so as to be nearer one or the other side. This permits selective location of the knob 26 according to the desire of the user, to fit against a selected portion of the face wherever the engagement of the knob is comfortable so far as the user is concerned and most conducive to maintenance of the camera in a stabilized, immobile position.

Still further, the construction permits the entire device to be pivoted to an out-of-the-way position, at such times as it is not desired to use the same. For example, the arm can be swung 90 degrees from its Figure 2 position to locate the knob at the side of the camera, the entire arm now being out of the way so far as the use of the camera is concerned. Adjustment of the arm between its inoperative and any selected operative position can of course be effected swiftly, as will be readily appreciated.

Still further, the device has the desirable characteristic that it is usable with conventional cameras, without modification or redesign of the camera in any way. When in use, the device permits stabilizing of the camera, by the person holding the same, whether or not they are wearing glasses, with the camera being stabilized against the face while still being held outwardly therefrom a distance sufficient to dispose the camera wholly clear of the glasses.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrated of the principles of operation and the means presently devised to carry out said principles, it being considered that the invention comprehends any minor change in construction that may be permitted within the scope of the appended claim.

What is claimed is:

The combination, with a screw projecting from a camera, of a steady rest comprising a substantially L-shaped arm including vertical and horizontal portions fixedly joined at one end, the horizontal portion having a longitudinal slot receiving said screw and being adjustable in the direction of its length upon the screw through the provision of the slot, said horizontal portion being pivotally adjustable about the screw in each position to which it is longitudinally adjusted; and knob-like means projecting outwardly from the other end of the vertical portion, capable of being pressed against the face of the user to hold the camera substantially immobile in front of the face, said knob-like means being mounted upon the vertical portion for adjustment longitudinally of the vertical portion.

References Cited in the file of this patent

UNITED STATES PATENTS

| | | |
|---|---|---|
| 2,199,662 | Greaves | May 7, 1940 |
| 2,357,377 | Bausch | Sept. 5, 1944 |